US 6,717,715 B2

(12) United States Patent
Holl et al.

(10) Patent No.: US 6,717,715 B2
(45) Date of Patent: Apr. 6, 2004

(54) FLEXURELESS MAGNETIC MICROMIRROR ASSEMBLY

(75) Inventors: Richard A. Holl, Camarillo, CA (US); Philip L. Lichtenberger, Thousand Oaks, CA (US)

(73) Assignee: Holl Technologies Company ( * ) Notice: Subject to any disclaimer, the term of this patent is extended or adjusted under 35 U.S.C. 154(b) by 0 days.

(21) Appl. No.: 09/917,188

(22) Filed: Jul. 27, 2001

(65) Prior Publication Data

US 2002/0067534 A1 Jun. 6, 2002

Related U.S. Application Data

(60) Provisional application No. 60/221,049, filed on Jul. 27, 2000.

(51) Int. Cl.[7] .............................. G02B 6/26; G02B 26/00
(52) U.S. Cl. ......................... 359/291; 359/280; 385/16; 385/17; 385/18; 385/19
(58) Field of Search ................................ 359/291, 293, 359/212, 213, 214, 221, 280; 385/16, 17, 18, 19, 20, 21, 22, 23, 24

(56) References Cited

U.S. PATENT DOCUMENTS

| | | | |
|---|---|---|---|
| 4,057,331 A | 11/1977 | Ong et al. | |
| 4,073,567 A | 2/1978 | Lakerveld et al. | |
| 4,317,611 A * | 3/1982 | Petersen | 359/214 |
| 5,345,521 A | 9/1994 | McDonald et al. | 385/19 |
| 5,493,406 A | 2/1996 | Sawaki et al. | 356/73.1 |
| 5,583,688 A | 12/1996 | Hornbeck | 359/291 |
| 5,650,881 A | 7/1997 | Hornbeck | 359/871 |
| 5,903,383 A | 5/1999 | Bernstein et al. | 359/298 |
| 6,028,689 A | 2/2000 | Michalicek et al. | 359/224 |
| 6,040,935 A | 3/2000 | Michalicek | 359/198 |
| 6,097,859 A | 8/2000 | Solgaard et al. | 385/17 |
| 6,262,827 B1 * | 7/2001 | Ueda et al. | 359/224 |

FOREIGN PATENT DOCUMENTS

| | | | |
|---|---|---|---|
| DE | 299 02 348 U | | 4/1999 |
| DE | 29902348 | * | 4/1999 |
| EP | 0 219 357 A | | 4/1987 |
| WO | WO 98 49675 A | | 11/1998 |

OTHER PUBLICATIONS

Vdovin, Gleb; Dec. 12, 1996; *Micromachined adaptive mirrors*; Delft University of Technology, The Netherlands.
Schuetz, Max, Bacon, Rusty, Tom, Yvette; Jul. 28, 2000; *MEMS Go Optical*; Thomas Weisel Partners.
http://www.isr.umd.edu/Courses/ ENM659S/mems/introduction.html; Oct. 19, 2000.
Garverick, Steve; http://www.ieee.org/organizations/pubs/newsletters/sscs/apr00/mems.htm; *Review of Fall workshop on MEMS Interface Circuits*; Oct. 19, 2000.
Dötzel, Prof. Dr. Wolfram; Michel, Prof. Dr. Bernd; Kurth, Dr. Steffen; http://www.infotech.tu–chemnitz.de/~microtec/eng/press/annualrep98/sub_b2.htm; Subprojekt B2: "*Investigation of cross–coupling in micromirror–arrays*"; Oct. 19, 2000.
Goodin, Bill; http://mems.isi.edu/archives/Announcements/ucla–ext3.html; UCLA short course on "*MEMS for Optical Applications*"; Oct. 19, 2000.

(List continued on next page.)

*Primary Examiner*—Hung Xuan Dang
*Assistant Examiner*—Tuyen Tra
(74) *Attorney, Agent, or Firm*—Greenberg Traurig, LLP; Christopher Darrow, Esq.

(57) ABSTRACT

A micro-optical switch including a flexureless magnetic micromirror hinged centrally over a pin, cone or the like. The pin, cone or the like allows the micromirror to rapidly switch or tilt into a plurality of predefined positions as accurately controlled by an microelectromagnetic assembly. A liquid surrounds the pin or cone, connects the bottom of the surface of the mirror with the substrate supporting the pin or cone, and provides a capillary force holding the mirror onto the pin or cone. The liquid low vapor pressure also dissipates heat generated by the fiberoptic beam reflecting off the top surface of the micromirror.

38 Claims, 7 Drawing Sheets

OTHER PUBLICATIONS

Dötzel, Prof. Dr. Wolfram, Frühauf, Doz. Dr. Joahim; Oct. 19, 2000; *Subproject A1 "Design of micromechanical commponents/microelements"*; http://www.infotech.tu-chemnitz.de/~microtec/eng/press/annualrep98/sub_al.htm.

Müller; Prof. Dr. Dietman; Brumme, Prof. Dr. Reinald; Barthel, Prof.. Dr. Rainer; Oct. 19, 2000; *Subproject A2 "System Design"*; http://www.infotech.tu-chemnitz.de/~microtec/eng/press/annualrep98/sub_a2.htm.

Woltr, Charlotte; Oct. 19, 2000; *Optical Switching Moves Into Spotlight*; http://www.x-changemag.com/articles/051work2.html.

Hart, Matthew; Oct. 19, 2000; *MEMS enhance optical switching*; http://www.informationweek.co.uk/story/OEG20000717S0039.

Sweeney, Dan; Oct. 19, 2000; *Mirrors and smoke: the optical challenge*; http://www.americasnetwork.com/issues/2000issues/ . . . /20000601_optswitch.ht.

Amato, Ivan; Oct. 20, 2000; *May the Micro Force be With You*; http://www.britannica.com/bcom/magazine/ar . . . /0,5744,305046,00.html?query=micromirro.

Hart, Matthew; Oct. 20, 2000; MEMS enhance optical switching; http://planetanalog.com/printableArticle?doc_id= OEG20000717S39.

Sweeney, Dan; Oct. 21, 2000; *Mirrors and smoke: The optical challenge*. (Industry Trend or Event); http://www.findarticles.com/ef_o/moDUJ/9_104/63540087/print.jhtml.

Allan, Roger; Oct. 21, 2000; *MEMS Designs Gear Up for Greater Commercialization* (Technology Information); http://www.findarticles.com/cf_o/m3161/12_48/63677804/print.jhtml.

Solomon, Howard; Oct. 21, 2000; *LambdaRouter no mirror trick: Device said to direct traffic 16 times faster than electrical switches, save 25 per cent in operations. Product Announcement)*; http://ww.findarticles.com/cf_0/m0GC/46_25/58062647/print.jhtml.

Brown, Stuart; Oct. 21, 2000; *MEMS Raise Testing Issues From the Beginning to the End of the Design Cycle* (Technology Information)(Technical) http://www.findarticles.com/cf_0/m3161/15_48/64190518/print.jhtml.

*Micromirros for next Hubble*. (*Brief Article*); Oct. 21, 2000; http://www.findarticles.com/cf_0/m0WVI/1999_Nov_29/58265877/pl/article.jhtml.

Nguyen, Vinh Q. and Matioushkina, Maria; Oct. 28, 2000; *Magnetically Actuated Micromirrors with Large Deflection Angle*; http://www.isr.umd.edu/Courses/ENMA659S/mems/.

Stix, Gary; Jan. 14, 2001; *Extensions to Fiberoptics will apply network capacity that borders on the infinite*; http://www.sciam.com/2201/0101issue/010stix.html.

Stix, Gary; Jan. 14, 2001; *Hunger for bandwidth drives all optical technology to market*; http://www.sciam.com/1998/1298issue/1298infocus.html.

\* cited by examiner

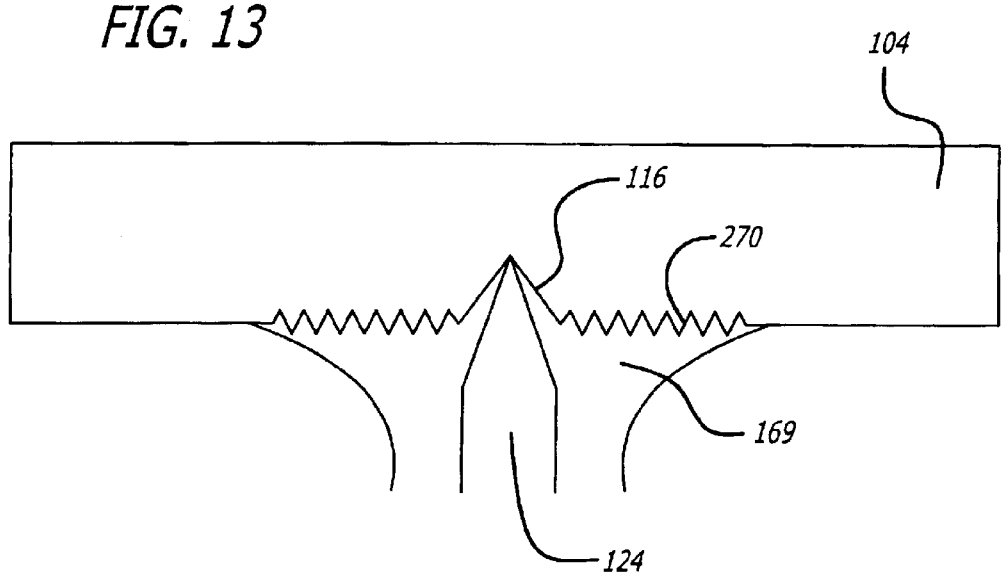
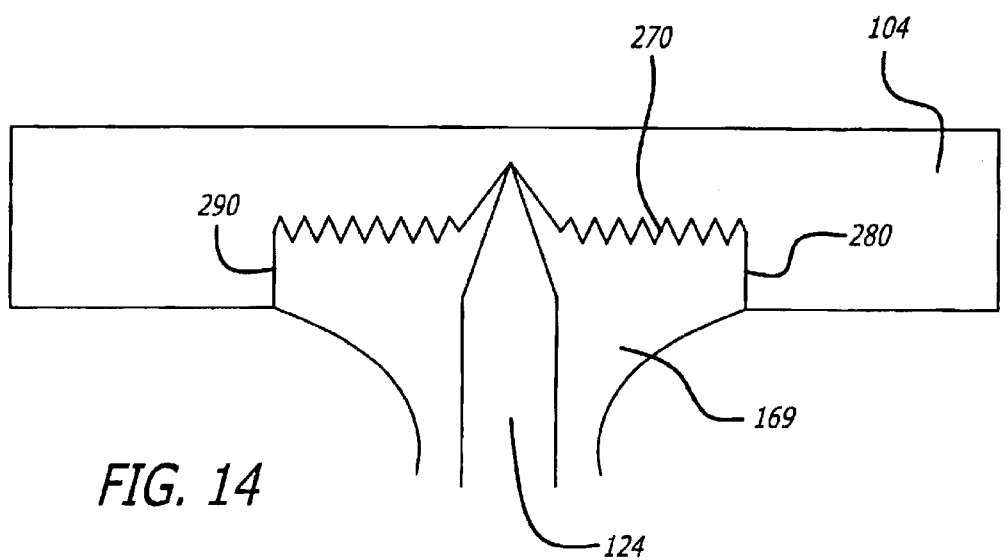

US 6,717,715 B2

FLEXURELESS MAGNETIC MICROMIRROR ASSEMBLY

CROSS-REFERENCE TO RELATED APPLICATION

This application claims the benefit of U.S. Provisional Application No. 60/221,049 filed Jul. 27, 2000, whose entire contents are hereby incorporated by reference.

BACKGROUND OF THE INVENTION

The present invention relates to microswitches and particularly optical micromirror switches.

An example of a flexureless micromirror device known in the prior art is shown in U.S. Pat. No. 6,040,935 (Michalicek). (The entire contents of this patent and all other patents, other publications and applications mentioned anywhere in this disclosure are hereby incorporated by reference.) The '935 patent discloses a flexureless micromirror assembly wherein the micromirror surface is attached to one or more support columns. These support columns are anchored to the structural assembly of the device by a flexible locking joint. Thereby, the mirror surface is free to move about the joint and the mirror surface can be electronically switched between multiple stable positions. Although such a device operates without the need to flex or bend any mirror surface through elastic bending or through piezoelectric flexing, its construction is complex and expensive to carry out.

U.S. Pat. No. 5,583,688 (Hornbeck) and U.S. Pat. No. 5,650,881 (Hornbeck) are examples of other prior art patents.

SUMMARY OF THE INVENTION

Accordingly, it is an object of the invention to provide a simplified construction and operation of a flexureless magnetic micromirror. This is done according to a preferred embodiment by hinging the micromirror over a centrally positioned pin or cone. The mirror is secured from moving laterally by a conical depression in the underside of the mirror and secured against lifting off of the mirror by engagement of the capillary force of a suitable liquid sandwiched between the mirror and the corresponding substrate mounted on a base. A plurality of microelectromagnets are is positioned directly below the periphery of the mirror. When these microelectromagnets are electronically activated they attract the corresponding metallic edge of the magnetic mirror. The central support pins height governs the tilt angle of the mirror, reflecting the incident light beam to become the reflected light beam. The simplicity of this invention allows the simultaneous assembly of large arrays of these micromirrors of high precision and minimal cost compared with the optical switches known in the prior art. Additionally, very high switching speeds are possible with this invention due to the absence of flexing resistances, initial retardation and mechanical friction. The tilt angle of the micromirror is preferably between sixteen and twenty degrees. The magnetic mirrors can be produced relatively inexpensively by manufacturing them of composites of powdered fillers and polymer matrix where the filler material is a magnetic material. The manufacturing process, including the production of the mirror surface, is described in application Ser. No. 09/345,813, filed Jul. 2, 1999.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 13 is a side cross-sectional view of an alternative micromirror of the present invention showing the liquid on the bottom surface thereof;

FIG. 14 is a view similar to FIG. 13 showing an alternative micromirror bottom surface construction.

DETAILED DESCRIPTION OF PREFERRED EMBODIMENTS OF THE INVENTION

Figure 1:
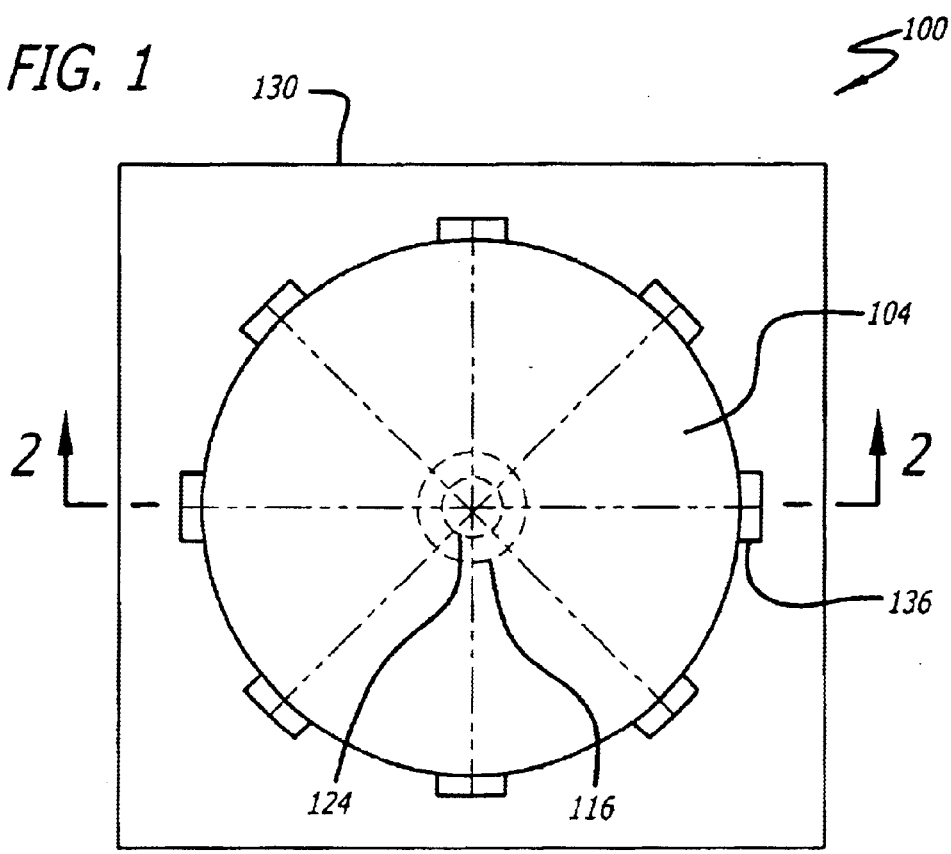
FIG. 1 is a top plan view of a micromirror switch assembly of the present invention.
Figure 2:
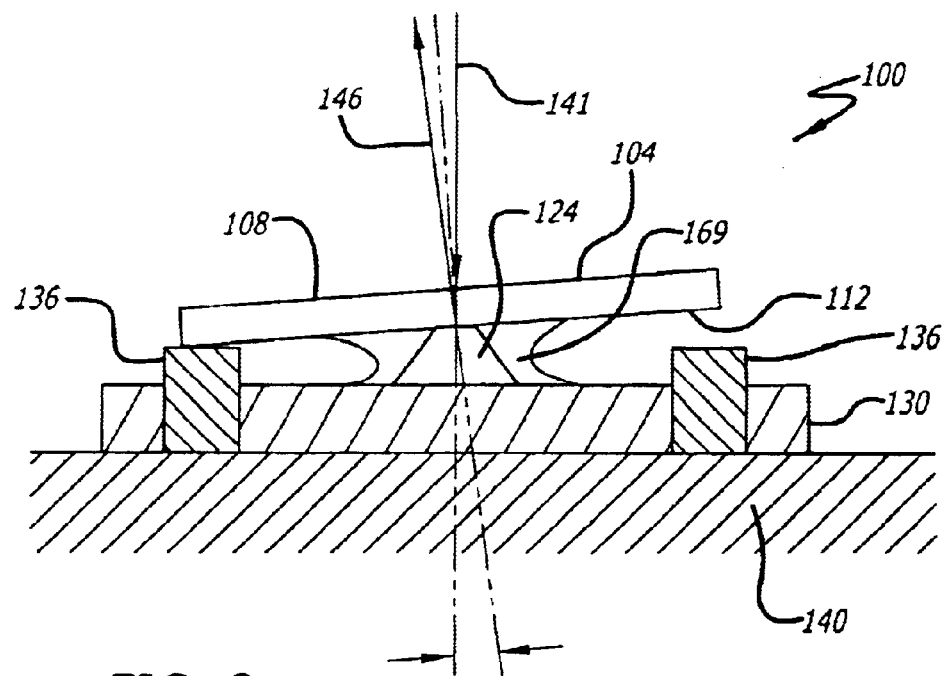
FIG. 2 is a cross-sectional view taken on line 2—2 of FIG. 1.

Referring initially to FIGS. 1 and 2, a flexureless micromirror assembly is illustrated generally at 100. It is seen to comprise a micromirror 104 having a top optically reflective surface 108 and a bottom surface 112. Formed on the bottom surface 112 is a depression 116 and fitted in the depression is the upper end of a centrally positioned pin or cone 124. The pin or cone 124 is mounted to the top of a substrate 130, and mounted in the substrate 130 are electromagnets 136 positioned to be beneath the lower perimeter edge of the micromirror 104. The substrate 130 then in turn is mounted on a support base 140, as shown in FIG. 2.

A number of spaced electromagnets 136 can be mounted to the substrate 130. In FIG. 1 it is seen that eight equally spaced electromagnets can be provided, which allows the micromirror 104 to have eight different tilted positions. Each position provides a different orientation of the top reflective surface relative to the vertical axis of the pin 124. Thus, when an incident beam 141 impacts the reflective surface 108 it will be reflected as a reflected beam 146 in a different direction and to a different receiving location, such as a different optical fiber. Thereby, by controlling the actuation of the electromagnets 136 using a control system (not shown) a different optical signal can be sent from a single incident beam.

Figure 3:
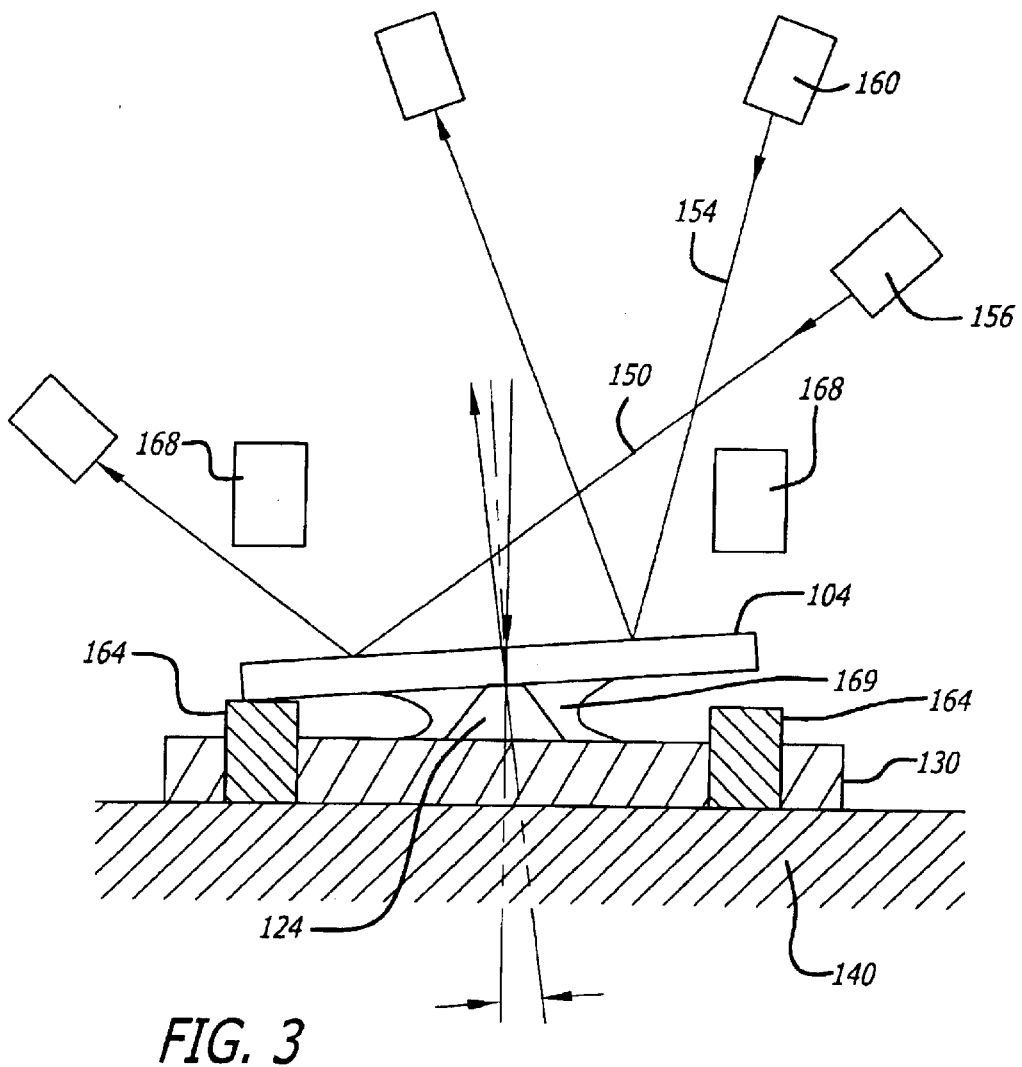
FIG. 3 is a view similar to FIG. 2 but showing an optional electromagnet arrangement and possible beam impact angles.
Figure 11:
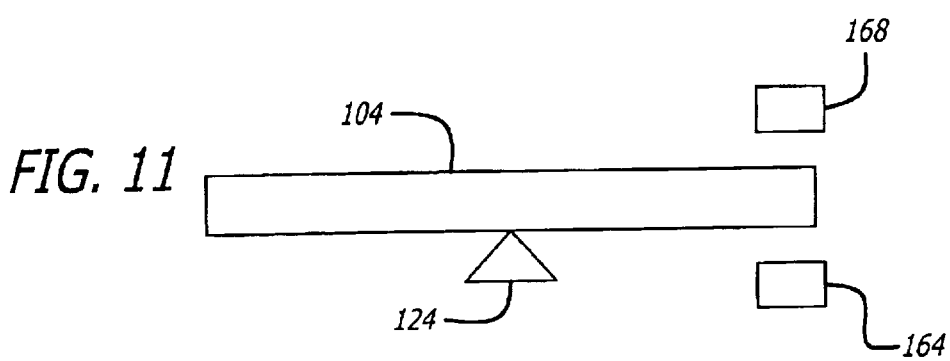
FIG. 11 is a schematic view of a micromirror switch assembly showing an alternative electromagnetic arrangement.

Referring to FIG. 3, the incident beam 150 or 154 need not impact the center of the micromirror 104 but rather may impact a location spaced from the center. FIG. 3 also shows that more than one incident beam or incident beam source such as the fiber optic cables 156,160 can be used for a single micromirror device. Additionally shown in FIG. 3 is an optional electromagnet arrangement wherein an electromagnet 164 is provided below the surface and another 168 above the surface. They can be held in spaced relation with a C-shaped connector, for example.

Where only first and second tilt positions are needed 180° relative to one another the electromagnetic assembly can comprise simply two magnets, one magnet 168 above and one magnet 164 below the perimeter of the micromirror 104 as shown in schematic form in FIG. 11. Thereby, when the bottom magnet 164 is energized, the micromirror 104 will tilt down to the right, as depicted in FIG. 11, tilting about the central pin 124. Similarly, when the top microelectromagnet 168 is energized, the micromirror 104 will tilt in the opposite direction with the right edge going up.

Liquid 169 is sandwiched between the micromirror and the substrate and around the pin. The capillary force of the liquid holds the micromirror 104 on the pin 124. The liquid 169, which assumes a catanoid shape, is preferably a low vapor pressure oil with high surface tension and high heat conductivity. The vapor pressure of the liquid 169 should be below 0.01 mm mercury at twenty-five degrees Centigrade. Preferably the surface tension of the liquid should be above thirty dynes per centimeter. An example of a usable liquid is #281 Heat Transfer Oil available from Schaeffer Manufacturing Company of St. Louis, Mo. It is a non-corrosive semi-synthetic heat transfer fluid, blended from high viscosity index paraffin base oils. See its two-page Technical Data sheet. Also usable is Hytherm Heat Transfer Oil available from Lyondell Lubricants. "Hytherm 46" is a heat transfer oil formulated from severely solvent refined, dewaxed and hydrofinished base oil along with an anti-oxidant/dispersant additive package.

Figure 4:
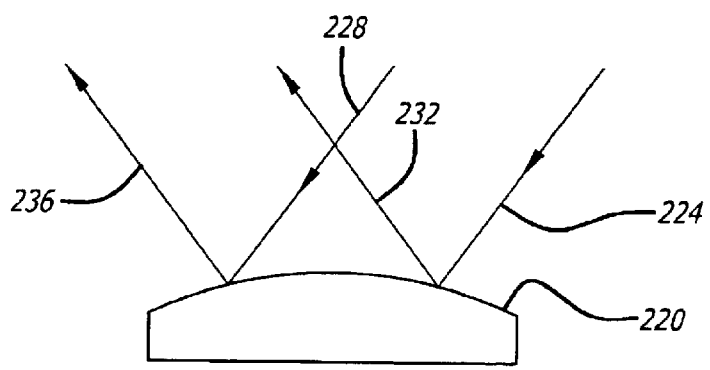
FIG. 4 is a side elevational view of an alternative micromirror construction for the assembly of FIG. 3 showing possible beam impact angles.

Although the micromirror 104 is depicted as having a planar top reflective surface 108, other configurations of this surface can be provided. An example is a concave surface 220 such as shown in FIG. 4 where two incident 224, 228 (and reflective 232, 236) rays are depicted. Other shapes such as concave or a gradually angularly changing surface are within the scope of the invention.

Figure 6:
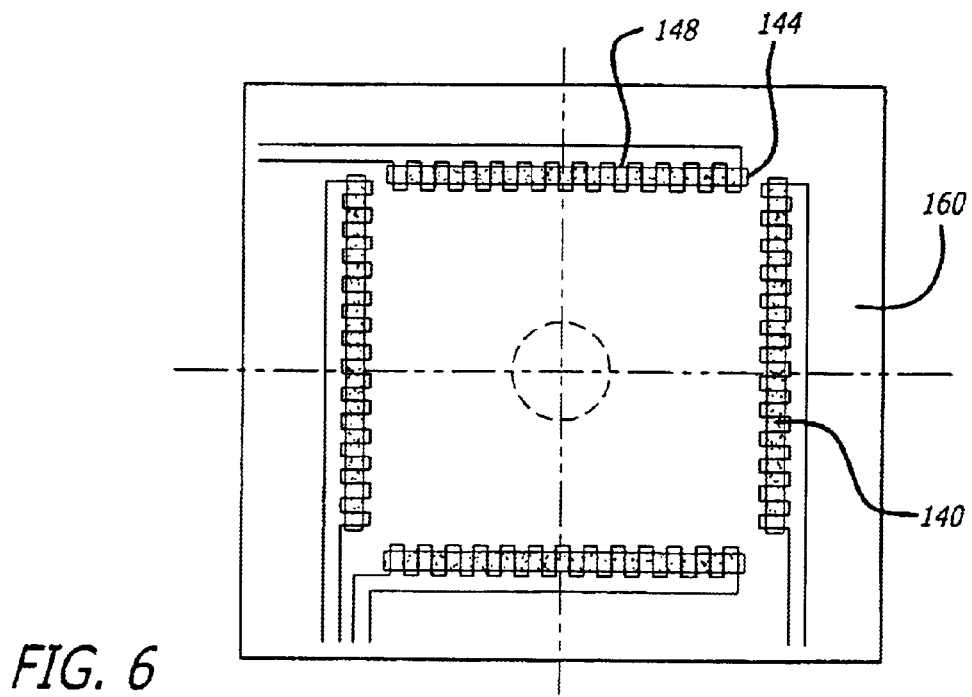
FIG. 6 is a top plan view of the base plate of the switch assembly of FIG. 5.

Eight magnets 136 are depicted in FIG. 1. Where fewer tilt angles are desired such as four perpendicularly-arranged tilt angles, four electromagnets only need to be provided as shown in FIG. 6. Four elongate thin film-deposited electromagnets 140 are used in the embodiment of FIG. 6. Each includes a core material 144 and a current conducting trace or coil 148 on the core material. FIG. 6 is a top plan view of the base plate 160 by itself, without the pin or micromirror for illustrative purposes.

Figure 5:
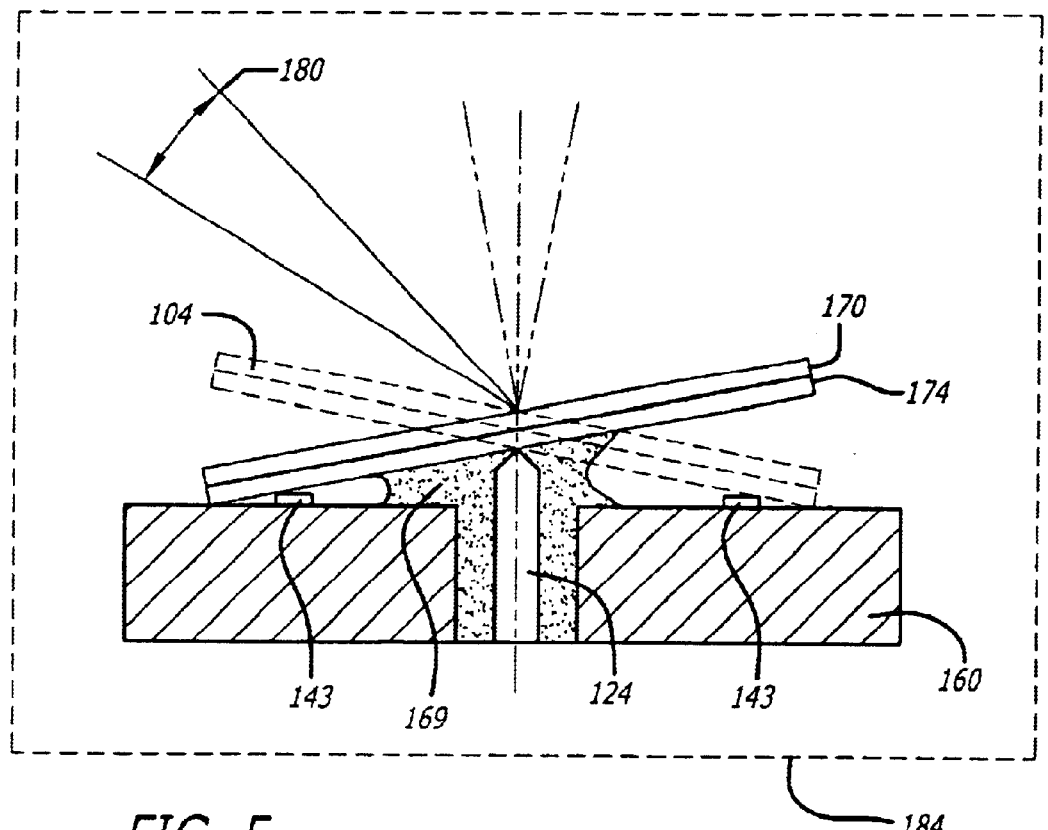
FIG. 5 is a cross-sectional view similar to the embodiment of FIG. 3 and showing an alternative embodiment with two tilted positions of the micromirror thereof.

FIG. 5 is a cross-sectional view through the micromirror assembly or optical switch which uses the base plate 160 of FIG. 6. It is seen there that a central pin 124 is mounted in the center of the baseplate. The pin 124 is preferably a sapphire pin having a very hard tip. Exemplary support ends can have a hardness greater than Mohs Scale 8. Two of the thin film electromagnets 143 are shown mounted on the substrate or baseplate in FIG. 5. The baseplate 160 can be a silicon carbide substrate which provides for good heat conductance and a hard impact resistant surface. The micromirror 104 has two layers. The top layer 170 is an ultra low loss glass supermirror, such as is available from Newport Corporation of Irvine, Calif., and the bottom layer 174 is a magnetic material layer. Around the entire lower edge perimeter of the bottom of the magnetic material layer or at least at the portions which will impact the silicon carbide substrate when the mirror is tilted and/or on the top surface of the silicon carbide substrate which will be impacted by the tilting mirror is a hard tilt stop to provide for high precision and repeatability. The optical switch is shown in two alternative tilted positions in FIG. 5 and the different reflective angles are shown by angle 180, which is 16° to the horizontal, 32° to flip back position.

The micromirror 104 should preferably weigh less than 0.03 grams and preferably 0.015 grams. The diameter of the micromirror 104 is preferably less than one millimeter, and preferably five hundred or three hundred micrometers. It can be round or polygonally shaped. The top mirror layer has a thickness less than two hundred or three hundred microns, and preferably twenty microns.

FIG. 5 shows with dotted lines a schematic representation of a chamber 184 in which the device can be positioned. The chamber can include a vacuum, a partial vacuum, helium or the like to improve switching capability.

The low vapor pressure oil 169 with high surface tension and high heat conductivity is shown surrounding the sapphire pin 124 and engaging the lower surface of the magnetic material layer 174 and the top surface of the silicon carbide substrate 160. The catanoid-like shape that the oil 169 assumes when the micromirror 104 is tilted to one side is best illustrated in FIG. 5.

Figure 7:
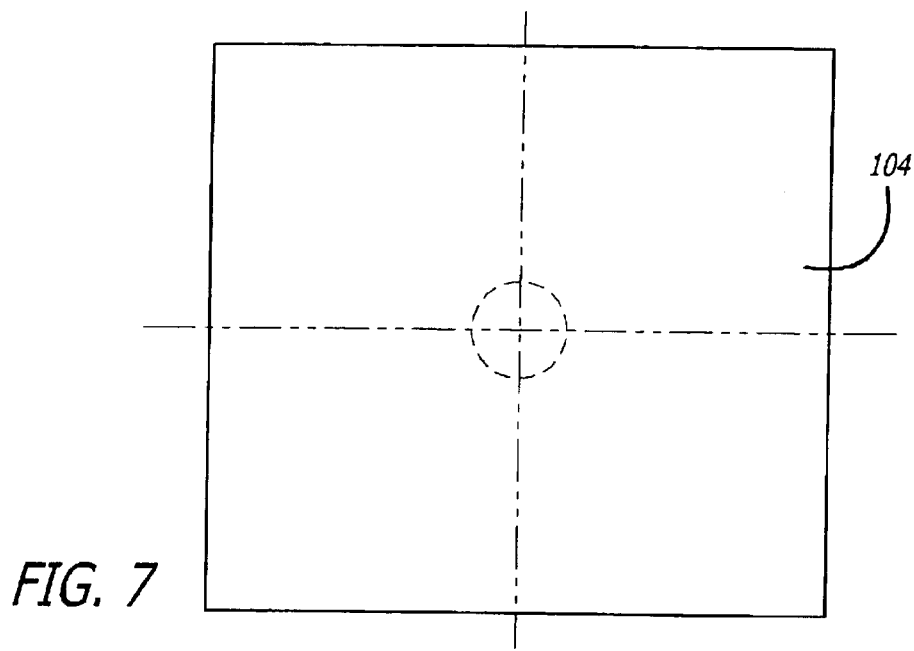
FIG. 7 is a top plan view of the micromirror of the assembly of FIG. 5.

In FIG. 1, for example, the micromirror 104 is shown to have a round shape. However, other shapes are within the scope of the present invention. An example of another shape is a square as shown in FIG. 7. It is shown to be three hundred micrometers by three hundred micrometers. A range of usable diameters for a round micromirror can be between one hundred and three hundred micrometers.

Figure 8:
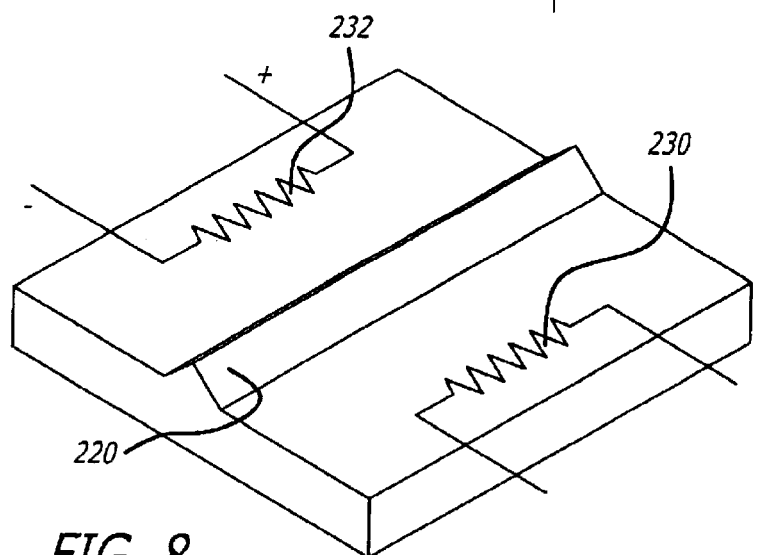
FIG. 8 is a perspective view of an alternative base plate for a micromirror switch assembly of the present invention.
Figure 9:
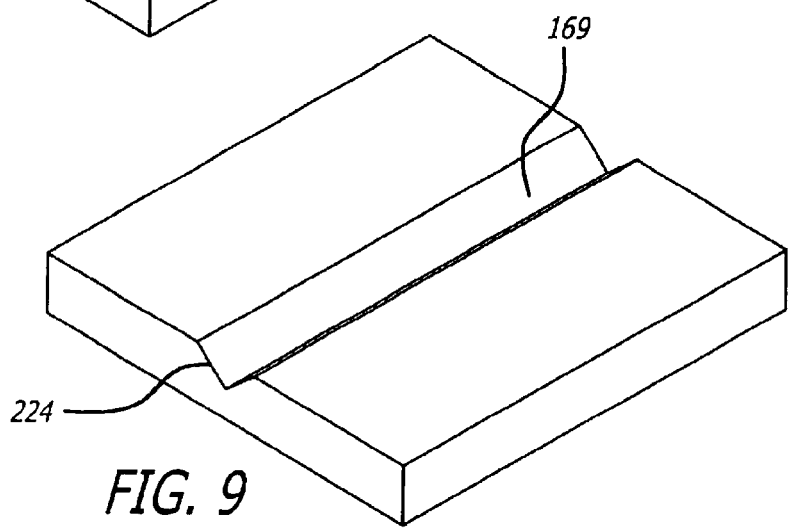
FIG. 9 is an inverted perspective view of a micromirror usable on the base plate of FIG. 8.

Instead of having a pin or cone 124 which is symmetrical about the vertical axis, another shape for the pin, cone or other support member is an elongate triangle as shown in FIG. 8 at 220. Similarly shaped depression 224 is formed in the bottom surface of the micromirror 104 and the liquid 169 is disposed in the depression 224 covering the elongate triangular support member on the substrate. The depression is shown in FIG. 9. This arrangement with a knife edge axis allows tilting of the micromirror 104 about that axis from one side to the other and the tilting can be controlled by a first and second electromagnetics 230, 232 disposed on the substrate on opposite sides of the support member 220.

Figure 10:
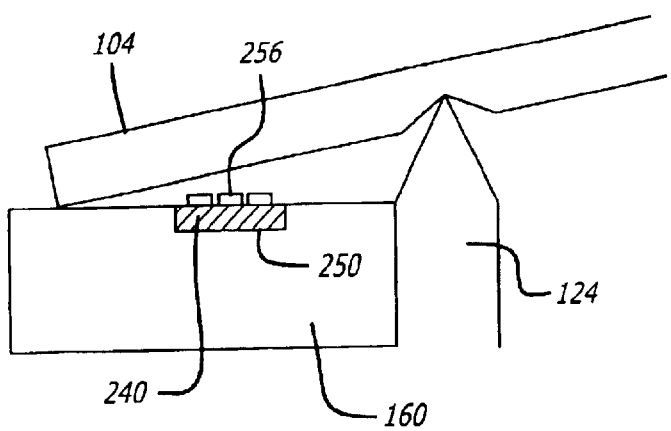
FIG. 10 is an enlarged inside cross-sectional view of an end of a micromirror switch assembly of the present invention showing one electromagnet arrangement.

An enlarged view of the left portion of an optical switch which does not have the liquid or in which the liquid is not depicted for illustrative purposes is shown in FIG. 10. Referring thereto it is seen that the core material 240 of the electromagnet is sputtered in a trough or indent 250 on the surface of the substrate and the current carrying coils 256 are sputtered on the top of the core material. In another exemplary embodiment, the electromagent includes a sputtered core and a sputtered winding on the core.

Figure 12:
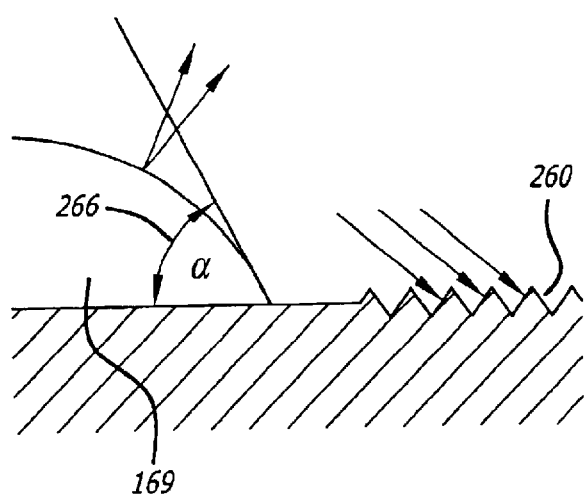
FIG. 12 is an enlarged view of the base plate of a micromirror switch assembly of the present invention showing the surface configuration of the base plate relative to the liquid.

To retain the liquid 169 so that it does not spread out and dissipate over the entire surfaces of the substrate and/or the lower surface of the micromirror a finely roughened surface 260 can be formed to define the exterior edge of the liquid coated surface. This is shown for the substrate in FIG. 12 with the angle of the liquid shown by angle 266. It is desired to contain the liquid so it does not impact the electromagnets.

Similarly, the area 270 to be covered by the liquid 169 on the bottom surface of the micromirror can also be roughened to define the outer perimeter of the liquid as shown in FIGS. 13 and 14. FIG. 14 shows an alternative to FIG. 13 wherein the roughened surface is and the depression for the pin are provided in a trough 280 on the bottom surface of the micromirror. This trough 280 also provides a perimeter wall 290 to additionally hold the liquid in place.

To prevent the liquid from heating and its vapor pressure rising, the area outside the roughened surface can have a non-heat transfer carrying insulating material such as TEFLON so the heat does not back up. Instead of TEFLON a very fine film of silicon grease can be provided. The grease might be applied using the manufacturer's finger or using some kind of pattern or rubber stamp. The latter is especially important where many mirrors are being manufactured and used, such as in a one hundred by one hundred array.

Figure 15:
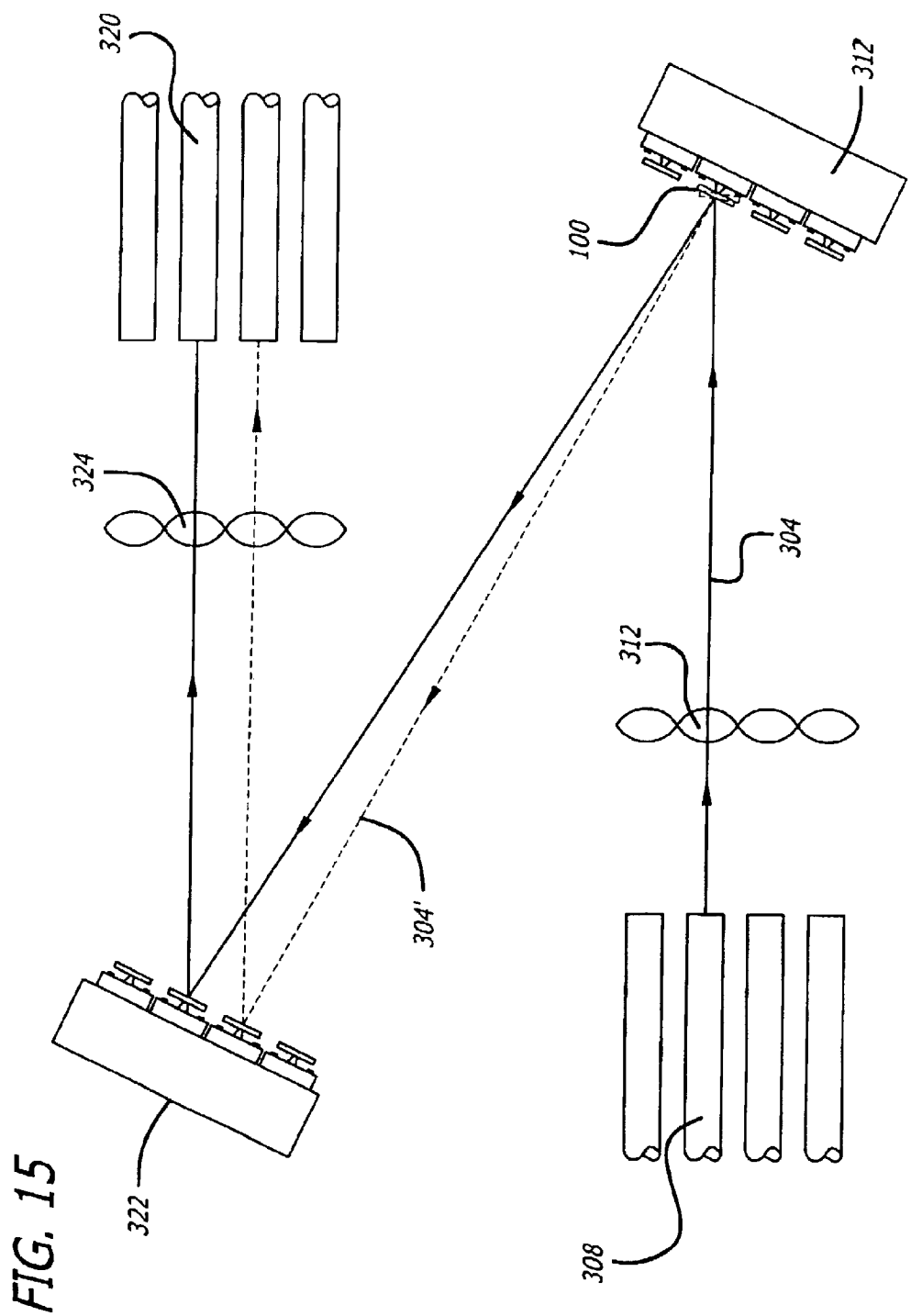
FIG. 15 is a schematic view showing an array of micromirror switch assemblies in an operative system.

An array system of this magnetic micromirror assembly or optical switch can be used in an N by N or N by 1 or other array. An example is shown in FIG. 15 generally at 300. Referring thereto, it is seen that the fiber optic origination and receiving fibers are shown as the mirror tilts. More particularly, the incident beam 304 from the fiber optic-fibers 308 passes through lenses 312, is reflected by switches of an array 312 to a different receiving fiber 320 after being reflected off of a second array 322 and passing through second lens 324 to represent a different signal. The dotted line beam 304 represents the reflected beam with the switch in a different tilted position.

From the foregoing detailed description, it will be evident that there are a number of changes, adaptations and modifications of the present invention which come within the province of those skilled in the art. For example, instead of reflecting optical beams other electromagnetic wave beams can be used. Also, the dimensions and materials used for the components can be varied as needed. Additionally, the elements of the various embodiments can be interchanged or omitted as would be apparent to those skilled in the art. However, it is intended that all such variations not departing from the spirit of the invention be considered as within the scope thereof.

We claim:

1. A micromirror assembly, comprising: a micromirror having a reflective top surface and a bottom surface; a support member having a member end; and the support member end supporting the micromirror for controllable tilting relative to the member end, further comprising liquid positioned relative to the bottom surface such that capillary force of the liquid holds the micromirror on the support member.

2. The assembly of claim 1 wherein the liquid has a low vapor pressure.

3. The assembly of claim 2 wherein the low vapor pressure is less than 0.01 mm mercury at 25 degrees C.

4. The assembly of claim 1 wherein the liquid is an oil.

5. The assembly of claim 1 wherein the bottom surface has a centrally positioned depression and the end engages in the depression.

6. The assembly of claim 1 wherein the end is a pointed end.

7. The assembly of claim 1 wherein the micromirror is able to pivot in any direction about an axis of the pointed end.

8. The assembly of claim 1 wherein the bottom surface has a centrally positioned slot, and the end engages in the slot.

9. The assembly of claim 1 wherein the end is an elongate edge deposed in the slot so that the micromirror can tilt about an axis of the slot.

10. The assembly of claim 1 wherein the support member comprises a pin.

11. The assembly of claim 1 wherein the support member comprises a cone.

12. The assembly of claim 1 wherein the support member comprises a needle.

13. The assembly of claim 1 wherein the end is made of sapphire.

14. The assembly of claim 1 wherein the support end has a hardness greater than Mohs Scale 8.

15. The assembly of claim 1 wherein the micromirror has a round disc shape.

16. The assembly of claim 1 wherein the micromirror is symmetrical about its vertical axis.

17. The assembly of claim 1 wherein the micromirror has a diameter of generally between 100 and 200 microns.

18. The assembly of claim 1 further comprising a beam source oriented so that an incident beam therefrom hits a center of the reflective surface.

19. The assembly of claim 1 further comprising a beam source oriented so that an incident beam therefrom hits the reflective surface at a location spaced from a center of the reflective surface.

20. The assembly of claim 1 further comprising a plurality of beam sources oriented so that their respective beams hit the reflective surface at different locations thereon.

21. The assembly of claim 20 wherein each of the beam sources is an optical fiber.

22. The assembly of claim 1 wherein the micromirror is tiltable about two, three or four equally spaced axes perpendicular to an axis of the member end.

23. The assembly of claim 1 wherein the micromirror is round and has a diameter of generally 200 micrometers.

24. The assembly of claim 1 further comprising an electromagnet on a support surface below the bottom surface.

25. The assembly of claim 24 wherein the electromagnet is sputtered on the support surface.

26. The assembly of claim 24 wherein the electromagnet includes a sputtered core and a sputtered winding on the core.

27. The assembly of claim 1 further comprising a magnet on the bottom surface.

28. The assembly of claim 27 wherein the magnet coats the entire bottom surface.

29. The assembly of claim 27 wherein the magnet is only on peripheral areas of the bottom surface.

30. The assembly of claim 27 wherein the magnet is sputter coated on the bottom surface.

31. The assembly of claim 27 wherein the magnet is a permanent magnet.

32. The assembly of claim 27 wherein the magnet is an electromagnet.

33. A micromirror assembly, comprising: a micromirror having a reflective ton surface and a bottom surface; a support member having a member end; and the support member end supporting the micromirror for controllable tilting relative to the member end and a magnet on the bottom surface, wherein the magnet is a mixture of zumarium, cobalt and nickel.

34. A micromirror assembly, comprising: a micromirror having a reflective ton surface and a bottom surface; a support member having a member end; and the support member end supporting the micromirror for controllable tilting relative to the member end and further comprising a substrate, the support member being a horizontal elongate member, the elongate member having an elongate edge defining the member end, the bottom surface having an elongate upwardly-disposed surfaced, and the elongate edge being disposed in the upwardly-disposed surface.

35. The assembly of claim 34 wherein the upwardly-disposed surface is a groove on the bottom surface.

36. The assembly of claim 34 further comprising liquid in the upwardly-disposed surface which exerts a capillary holding action on the micromirror.

37. The assembly of claim 34 further comprising electromagnets on either side of the elongate member to cause the micromirror to controllably tilt from side to side.

38. The assembly of claim 37 further comprising a substrate, the elongate member being supported by and extending up from the substrate, and the electromagnets being supported on the substrate.

* * * * *